J. H. GLAUBER, DEC'D.
THE CITIZENS SAVINGS AND TRUST CO., EXECUTOR.
CLAMP AND GASKET.
APPLICATION FILED MAR. 29, 1915.
1,213,186.
Patented Jan. 23, 1917.
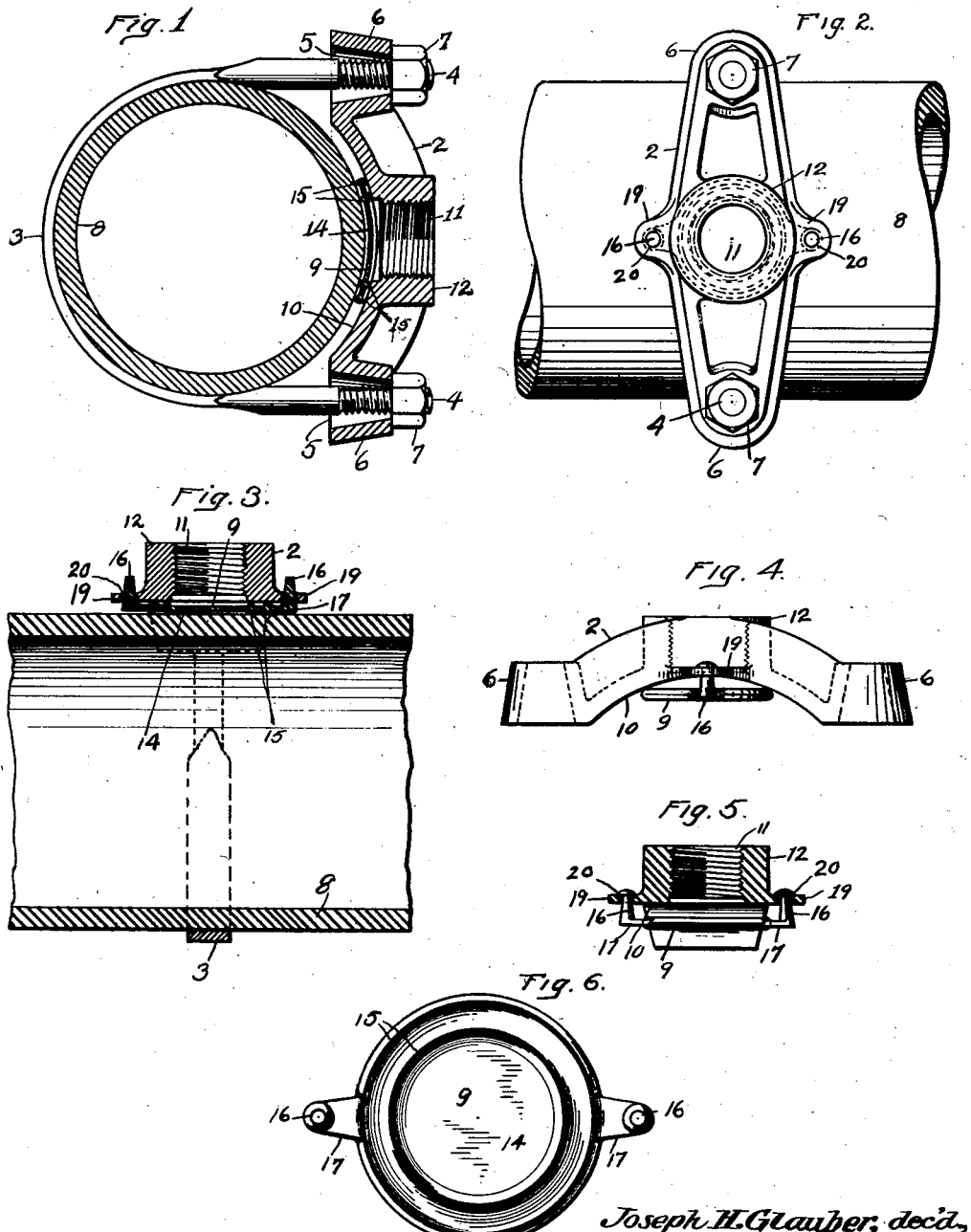

UNITED STATES PATENT OFFICE.

JOSEPH H. GLAUBER, DECEASED, LATE OF CLEVELAND, OHIO, BY THE CITIZENS SAVINGS AND TRUST CO., EXECUTOR, OF CLEVELAND, OHIO.

CLAMP AND GASKET.

1,213,186.  Specification of Letters Patent.  Patented Jan. 23, 1917.

Application filed March 29, 1915. Serial No. 17,899.

*To all whom it may concern:*

Be it known that JOSEPH H. GLAUBER, deceased, late a citizen of the United States, formerly residing at Cleveland, in the county of Cuyahoga and State of Ohio, did invent certain new and useful Improvements in Clamps and Gaskets, of which the following is a specification.

This invention consists of an improved clamp and gasket for effecting a tapped union between two pipes in a simple and convenient way without possible displacement of the gasket from its proper working relation with the clamp.

In the accompanying drawing, Figure 1 is a transverse section of a service pipe with the improved clamp and gasket secured in tapping position thereon. Fig. 2 is a front elevation of the pipe and clamp. Fig. 3 is a longitudinal section of a pipe and a transverse section of the saddle and gasket. Fig. 4 is a side view of the clamp saddle with the gasket secured in slidable relations therewith, and Fig. 5 is a cross section of the saddle and an edge view of the gasket. Figs. 6 and 7 are plan and side views of the gasket, full size.

The clamp comprises a saddle 2 and a strap or yoke 3 having screw-threaded extremities 4 adapted to extend through the tapering openings 5 in the opposite ends 6 of the saddle. Nuts 7 serve to secure said saddle and strap together upon a service pipe 8, and a lead gasket 9 is clamped between the curved seat 10 of the saddle and the curved wall of the pipe opposite the screw-threaded opening 11 of the central hub 12 of the saddle. Tapping of the pipe is effected by suitable tools introduced through opening 11, and in the present device tapping is through the solid central portion 14 of the disk gasket 9 as well as through pipe 8. A fluid-tight seal is effected by the concentric ribs 15 on both sides of the gasket, and two or more such ribs may be used. The inner curved face or seat 10 of the saddle is plain preferably.

The proper placing and maintenance of the gasket relatively to the opening 11 in the saddle is effected in a positive manner by a pair of tapering pins or lugs 16 projected parallelly in the same direction at one side of the plane of the gasket from integral ears 17. The pins or lugs 16 are relatively heavy and not easily bent, and the ears 17 are of the same thickness as the body of the gasket and extend radially on a diametrical line at the peripheral edge of the gasket. The saddle 2 has two lobes or side projections 19 at the sides of the seat 10, and round openings or recesses 20 in these lobes or projections accommodate the pins or lugs 16. The openings 20 extend through the lobes preferably, and the lugs 16 are of sufficient length to permit the ends thereof to be upset or spread to hold the gasket permanently in place, assuming that a permanent connection is desired. In other words, the gasket will remain in fixed axial alinement with the seat opening 11 when the saddle is clamped upon the pipe and the gasket compressed to conform to the curvature of the pipe and seat 10. No displacement or loss of the gasket can occur while the work is under way, nor while the parts are being handled, nor in shipments and while in storage.

The pins or lugs on the gasket and the open lobes or loops on the saddle serve to both guide and hold the gasket in its proper and predetermined position at all times, and this is of decided advantage when the clamping operation takes place in a trench and under difficult working conditions. When the gasket is riveted to the saddle by heading the pins it is fixed in a retired position within the in-curved portion of the saddle and more or less protected from injury in shipment and its loss is also prevented. Separate handling and storing of the saddle and gasket is also avoided on the part of the dealer and user.

The solid central portion of the gasket strengthens the gasket as a whole and preserves the circular shape of the gasket when it is bent from the flat into a curved form, thus retaining its seating efficiency; and the gasket is usually made of lead but might be made of rubber or other material.

The invention is applicable to water, gas and other service connections, and to a double strap saddle as well as a single strap saddle such as shown.

What is claimed:

1. In a service connection, the combination of a clamping saddle having a curved seat and recesses at the sides thereof, with a gasket having lugs projected into said recesses to hold the gasket from displacement.

2. In a service-connection, a clamping saddle having a curved seat and open projections at the sides of said seat, in combination with a gasket having lugs projected at an angle to the seating plane of the gasket and adapted to extend into said open projections.

3. In a service-connection, a saddle and clamping means therefor, said saddle having open ears transversely thereof at its middle portion, in combination with a gasket having integral lugs projected in slidable engaging relations with said open ears.

4. In a service-connection, a saddle having a curved seat, in combination with a gasket riveted to said saddle opposite said seat.

5. In a service-connection, a saddle having a curved seat, in combination with a gasket permanently affixed to said saddle in movable engaging relations with said seat.

6. In a service-connection, a saddle having a curved seat and open ears, in combination with a flat gasket having headed lugs slidably engaged with said ears.

7. In a service-connection, a saddle and clamping means therefor, said saddle having a curved seat and lateral open projections at the sides of said seat, in combination with a gasket having lugs projected in the same direction at right angles to the plane of its seating face and adapted to enter and slidably engage said open projections.

8. A saddle having open ends and a curved seat, a clamping strap and nuts connected with said saddle ends, and recessed ears at the sides of said saddle adjacent said curved seat adapted to receive and positively hold a gasket upon and in permanently centered alinement with said seat.

9. An article of manufacture and sale, comprising a circular gasket for service clamps having relatively rigid fastening and guide projections adjacent the peripheral edges thereof and extending in the same direction on substantially parallel lines with the axis of the gasket.

10. A ring-shaped gasket having lateral ears provided with relatively rigid integral pins projecting in the same direction to guide and fasten the gasket in centered seating relations with a service clamp member.

11. A gasket for service clamps, comprising a lead disk having a border sealing rib and relatively rigid projecting pins adjacent said rib to guide and secure the gasket upon the clamps.

12. A gasket for service clamps comprising a solid disk having annular ribs on opposite sides thereof and provided with relatively rigid integral ears having projections extending in the same direction at one side of the plane of said disk.

13. A gasket for service clamps comprising a flat lead disk having raised sealing portions and relatively rigid tapered pins projected in the same direction at different radial points on said disk.

14. A gasket for service clamps having concentric ribs and relatively rigid round pins projected therefrom at one side of the plane thereof.

15. A soft metal gasket for service clamps comprising a round flat disk having a plural number of concentric ribs on opposite sides thereof adjacent its periphery and provided with a pair of relatively rigid integral extensions on the same diametrical line having tapering pins projected therefrom.

THE CITIZENS SAVINGS & TRUST CO.,
    *Executor of Joseph H. Glauber, deceased.*
GEO. LOMNITZ,
    *Secretary.*

Witnesses:
  WM. SIEGEL,
  J. C. ARMSTRONG.